United States Patent Office 3,377,332
Patented Apr. 9, 1968

3,377,332
PURIFICATION OF OLEFIN POLYMERS
WITH METHANOL
Karl Ziegler, Kaiser-Wilhelm Platz 1, Mulheim (Ruhr), Germany, and Heinz Breil, Erhard Holzkamp, and Heinz Martin, all of Mulheim (Ruhr), Germany; said Breil, said Holzkamp, and said Martin assignors to said Ziegler
No Drawing. Continuation of application Ser. No. 218,527, Aug. 22, 1962, which is a continuation-in-part of application Ser. No. 469,059, Nov. 15, 1954. This application Sept. 13, 1966, Ser. No. 580,144
Claims priority, application Germany, Nov. 17, 1953, Z 3,799
6 Claims. (Cl. 260—94.9)

This invention relates to the purification of olefin polymers and is a continuation of our copending application Ser. No. 218,527, filed Aug. 22, 1962, and is a continuation-in-part of our copending applications Ser. No. 469,059, filed Nov. 15, 1954, Ser. No. 482,412, filed Jan. 17, 1955, Ser. No. 745,999, filed July 1, 1958, which, in turn, is a continuation-in-part of application 482,413, filed Jan. 17, 1955, and application Ser. No. 745,850, filed July 1, 1958, which is, in turn, a continuation-in-part of application 554,609 of Dec. 22, 1955 and of Ser. No. 514,068, filed June 8, 1955.

An object of the invention is the removal of certain metal groups from normally solid olefin polymers obtained by polymerization in the presence of a catalyst system comprising an organo-metal compound and a heavy metal compound.

The invention and its objects will become apparent from the following examples and description:

EXAMPLE 1

Twenty cc. of aluminumtripropyl are carefully mixed with 0.2 gram titanium tetrachloride, which results in a very vigorous generation of heat. The solution becomes an opaque black, and is introduced under nitrogen into an autoclave of a volume of 500 cc. 60–70 grams of ethylene are forced in the autoclave which is then heated while shaking to 100° C. Within the course of 15 hours, the pressure drops to about 20 atm. The reaction mixture is allowed to cool and the excess ethylene is blown off. The content of the autoclave is in the form of a paste-like mass which consists of a mixture of high-molecular ethylene and low-molecular liquid and solid, soluble products. It is stirred with methyl alcohol, extracted with methyl-alcoholic hydrochloric acid and thereupon with acetone. There remains 30 grams of an insoluble residue of high melting point which consists of a snow-white, finely granular, powdered mass of polyethylene. The powdery mass is pressed between metal plates heated to 150° C. and thereafter rapidly cooled, thus, forming a film which is extremely elastic and can be torn only with the application of a very great force.

EXAMPLE 2

Two grams of titanium tetrachloride were added, drop by drop, with the exclusion of air, into 40 cc. of aluminum triethyl. A black precipitate formed with a vigorous production of heat. 200 cc. of hexane were added to the mixture, and a part of the dark substance which had formed precipitated and another portion remained in solution with a dark color in the hexane, presumably in colloidal solution. The hexane fraction was transferred into a 500 cc. autoclave which was filled with nitrogen and ethylene was introduced up to a pressure of 60 atmospheres. Upon shaking, the temperature increased spontaneously to 60° C. and the pressure dropped 25 atmospheres. The introduction of ethylene under pressure was repeated but another strong rise is temperature was not noted. Nevertheless, the ethylene pressure receded again though more slowly. Ethylene was introduced under pressure a total of five times, a total of 88 grams of ethylene being introduced in this manner into the autoclave. After a total of 65 hours, it was possible to blow only 4 grams of ethylene out of the autoclave. The content of the autoclave consisted of a solid mass which could be crushed only with a difficulty and which had completely absorbed the solvent used. This mass was broken out of the autoclave in a suitable manner, introduced into methyl alcohol and thereupon heated with methyl-alcoholic hydrochloric acid. After filtration, washing with methyl alcohol and drying, 80 grams of a white difficultly soluble power were obtained which was pressed between heated metal plates at 160–170° to form clear transparent sheets having extremely good mechanical properties. A narrow strip cut out of such a sheet was stretched in the cold to about 3–4 times its length, in which connection the characteristic phenomena known from the stretching of polyamide tapes was observed. The tear strength of the stretched tapes was as high as 30 kg./mm.$^2$.

EXAMPLE 3

Example 2 is repeated using as the polymerization excitor the black precipitate which settled upon dilution with hexane which was completely freed from dissolved portions of aluminum triethyl by repeated formation of a suspension with hexane, settling and pouring off of the solvent all with the exclusion of air. In all other respects the procedure and results are substantially the same as in Example 2.

EXAMPLE 4

Five hundred cc. of liquid paraffin are deaerated by the introduction of nitrogen and heating to 100° C. After cooling there are added 58 grams of an aluminum trialkyl of the average composition of aluminum tridodecyl, whereupon 2.6 grams titanium tetrachloride are admixed while stirring under nitrogen. The mixture becomes an opaque black. However, no solid precipitate settles out. Thereupon ethylene is introduced while stirring at room temperature. The temperature rises during the course of ½ hour by itself from 23 to 43° C. and the ethylene is vigorously absorbed at a rate of about 10 grams per hour. Soon after the beginning of the experiment it can be noted that difficultly soluble substance separates out of the mixture. After about 3–4 hours, the absorption of ethylene decreases. There is then added, while stirring, 200 cc. hexane in order to dilute the reaction mixture and make it more easily stirrable, whereupon methyl alcohol is added. The reaction mixture at first still remains dark. Only upon suction filtering in contact with air does it change into a light olive green. This color is furthermore at first characteristic of the filtered precipitate. If the precipitate, after washing with methyl alcohol, is heated very slightly with about 5% nitric acid, it becomes pure white. It is then again filtered, washed with methyl alcohol and dried. There are obtained 40 grams of a pure white very loose powder which after pressing into sheets shows all the properties described for the product obtained in accordance with Example 2. The activity of the catalyst can be improved and more polyethylene obtained per gram of catalyst if the entire quantity of catalyst is not introduced at the beginning but the catalyst is rather added gradually drop by drop over a lengthy period of time. The same test can also be carried out with cooling of the reaction mixture to 20° C., particularly if a more readily mobile solvent such as hexane is used instead of liquid paraffin. The reaction time is then of course increased.

EXAMPLE 5

Example 4 is repeated but the solution of the catalyst in the liquid paraffin is warmed to about 40–50° C. and then the gas mixture is passed through it. The said gas mixture contains about 10–20% ethylene as obtained by the thermal cracking of ethane. The course of the reaction is substantially the same as Example 4 but it takes about 10–12 hours before the same quantity of polymer is formed.

EXAMPLE 6

Six liters of hexane, 82 grams aluminum triethyl and 24 grams titanium tetrachloride are stirred with ethylene of a maximum pressure of 5 atm. in the apparatus described in the preceding example. The initial temperature is 25° C. The temperature rises by itself to 35° C. After a total of 12 hours, the reaction is interrupted. There is then present in the autoclave a thick paste which is worked up in the manner described in detail in Example 5. There is obtained about 1 kg. of a colorless, high-grade polyethylene which can be used directly as molding powder.

EXAMPLE 7

One gram of solid zirconium acetylacetonate is carefully added to 40 cc. aluminum triethyl. The zirconium salt passes into solution with a yellow color and the color then changes after it has been standing for about 10 minutes via brown to black. 200 cc. of hexane is added to this mixture whereupon it is introduced, under nitrogen, in a 500 cc. autoclave of ordinary steel. A total of 110 grams ethylene is then introduced under pressure in about 4 portions. The addition of the ethylene is so regulated that the initial pressure after the heating to about 100° C. is 90–100 atm. The autoclave is then shaken at 100° C. Two to three hours after the introduction of ethylene in each case there is noticed a rapid decrease in the pressure down to 10–20 atm. After the introduction under pressure of a total of 110 grams ethylene, the ethylene absorption proceeds only slowly evidently due to the fact that the contents of the autoclave have solidified at this time into a mixture of solid polyethylene and hexane which is no longer mobile and therefore can no longer be brought actively enough into contact with the ethylene by shaking. By using an autoclave which is provided with a strong agitator, this difficulty can be avoided and the absorption of the ethylene continued further. Small quantities (5 grams) of non-polymerized ethylene are thereupon drawn off and the autoclave opened. The content consists of a solid, snow-white mass dispersed with liquid which is stirred with methyl alcohol, suction filtered, heated with methyl-alcoholic hydrochloric acid in order to remove the metal compounds and then washed with methyl alcohol. No substantial quantities of soluble paraffin are extracted from the mass with boiling acetone. After drying at about 100°, the polyethylene represents a snow-white, finely granular powdered mass which upon pressing between metal plates heated to 150° C. followed by rapid cooling is converted into a clear and sometimes opaque film. This film is extremely elastic and can be torn only with the application of a very great force. The yield is practically quantitative.

EXAMPLE 8

Add 4 grams zirconium tetrabromide to 20 cc. aluminum triethyl, grind the mixture for three hours in 200 cc. hexane in a ball mill and introduce the suspension into a 500 cc. autoclave. At 60° to 70° C. and 70 atmospheres ethylene pressure, 122 grams polyethylene are obtained after 24 hours which are treated as described in Example 4.

EXAMPLE 9

250 moles aluminum triisobutyl are dissolved in 250 cc. diesel oil and 25 moles zirconium tetrabutylate added. Stirring intensively, the mixture is heated for five hours at 100° C. The catalyst mixture is diluted with 1500 cc. diesel oil and ethylene introduced at 55° C. for 6 hours. 10 grams polyethylene are formed which are treated as described in Example 4.

EXAMPLE 10

Twenty grams diethylaluminum chloride are mixed carefully with 1 gram titanium tetrachloride, in which connection this solution assumes a brown color and a precipitate deposits. 200 cc. air-dry hexane is added (all such operations being carried out under nitrogen); this, including the precipitate, is then transferred into a 500 cc. autoclave and ethylene is forced in to a pressure of 100 atm. Upon shaking the contents of the autoclave spontaneously become heated to 60–70° C., and at the same time the ethylene pressure slowly drops. The addition of ethylene is repeated together with shaking three or more times. After shaking for a total of 10 hours, the ethylene has disappeared practically completely and the autoclave is filled with a paste consisting of the solvent used and a white ethylene polymer. The entire reaction mixture is stirred with methyl alcohol in order to decompose the aluminum compound, followed by suction filtering, washing with methyl alcohol and treatment finally at about 100° C. with dilute nitric acid. The polyethylene obtained is again washed thoroughly, filtered and dried. In this way, there is directly obtained a snow-white polyethylene suitable for use as molding powder, the softening point of which is about 150° C. This material can be excellently molded into transparent foils which can also be stretched.

The example is repeated using in place of the diethylaluminum monochloride the same quantity of so-called sesquichloride. The yield of polyethylene corresponds precisely to the total quantity of monomeric ethylene which has disappeared.

EXAMPLE 11

Example 10 is repeated but after the addition of the hexane ethylene is introduced under a pressure of 1 atm. with stirring. The solution spontaneously becomes heated to about 40° C. Even during the stirring, the difficulty soluble polyethylene precipitates. The introduction of the ethylene is continued until the mass has become a paste which can scarcely be stirred any longer and it is thereupon worked up in the manner described in Example 10. The conversion into polyethylene of the ethylene consumed is quantitative. The ethylene consumption can be easily determined by a simultaneous measurement of the ethylene flowing into the apparatus and the ethylene leaving the apparatus. The experiment can be carried out on as large a scale as desired. Furthermore it can without difficulty be carried on with recycled ethylene.

EXAMPLE 12

Example 10 was repeated using 20 grams methoxydimethyl-aluminum in place of the diethylaluminum chloride (prepared in accordance with the method of A. V. Grosse and J. M. Mavity, Journal of Organic Chemistry 5 (1940), page 118) and 2 grams zirconium tetrachloride in place of the titanium tetrachloride. The experiment has a course similar to that described in Example 10.

EXAMPLE 13

To a solution of 4.06 grams (24 mmols) piperidyl-diethylaluminum in 40 ml. hydrogenated Fischer-Tropsch diesel oil which has been distilled over sodium there are added 0.46 gram (2.4 mmols) titanium tetrachloride while stirring. The solution in this connection assumes a reddish color and a brown precipitate deposits. By heating to 80° C. the depositing of the precipitate is completed, the precipitate having a blackish brown color while the superjacent solution is a yellowish-brown. The catalyst mixture obtained in this manner (solution and precipitate) is introduced into a 200 ml. autoclave and 20 grams of ethylene is forced in at pressure of 30 atm. Upon heating to 60–70° C. and shaking for a total of 24 hours, the ethylene pressure decreases. Thereupon there can be obtained from the autoclave, after the excess ethylene (5 grams) has been let off, a brown paste from which the ethylene polymer (about 15 grams) can be obtained in the form of a snow-white powder by decomposing the catalyst compound with methyl alcoholic hydrochloric acid followed by washing with acetone. The piperidyldiethylaluminum is prepared in the following manner:

To one mol aluminum triethyl there is slowly added, drop by drop, at room temperature while stirring and with the exclusion of air and moisture 1 mol of completely dry piperidine. In this connection, the temperature rises to about 50° C., and an addition compound is first formed. By thereupon carefully heating to 120–140° C., this addition compound of aluminum triethyl on piperidine is decomposed with the splitting off of ethane. The piperidyldiethylaluminum is thus obtained as colorless viscous liquid which can be distilled in a high vacuum (95–100° C., $10^{-3}$ mm. Hg) which liquid becomes completely and thoroughly crystalline upon cooling with ice water. It has a melting point of 44–45° C.

EXAMPLE 14

Fifty-eight one-hundredths of a gram (2.5 mmols) zirconium tetrachloride are shaken together with 4 ml. dimethylaminodiethylaluminum in 50 ml. hexane under nitrogen for 3–4 hours in a ball mill. The catalyst suspension obtained (light brown liquid and brown precipitate) is introduced into a 200 ml. autoclave. After the introduction under pressure of ethylene (20 grams) the autoclave is shaken for about 50 hours while heating to 100–120° C. After the excess ethylene (5 grams) has been let off, ethylene polymers (about 15 grams) can be isolated. The further working is effected in the same manner as indicated in Example 13. The dimethylaminodiethylaluminum is prepared in the following manner:

Into 1 mol aluminumdiethylhydride in 100 ml. pentane, there is introduced slowly while stirring at room temperature 1 mol of dimethylamine. As a result of the heat of reaction, the pentane boils and 1 mol hydrogen is liberated. After the solvent is evaporated off, the dimethylaminodiethylaluminum distills over at a pressure of 0.15 mm. Hg and 66° C. By cooling in ice water it can be obtained in crystalline form (solidification point 5–6° C.).

EXAMPLE 15

Eleven and four-tenths grams (78 mmols) ethylmercaptyldiethylaluminum in 50 ml. hexane are carefully mixed with 1.48 grams (7.8 mmols) titanium tetrachloride. The brownish-black catalyst solution is introduced into a 200 ml. autoclave and after the addition of ethylene under pressure (about 30 atm.) heated while shaking to 50–60° C. The ethylene pressure drops completely within 5–6 hours. The ethylene polymer (15 grams) removed from the autoclave is further worked in the same manner as indicated in Example 13.

The ethylmercaptyldiethylaluminum is prepared as follows:

1 mol ethylmercaptan is slowly introduced at room temperature into a mol of aluminum triethyl while stirring, with the exclusion of air and moisture. In this connection, the corresponding quantity of ethane is immediately developed by the spontaneous heating of the mixture. After a short subsequent heating the ethylmercaptyldiethylaluminum can be obtained by distillation in a water-jet vacuum (160/2° C., 12 mm. Hg) in the form of a colorless, readily movable liquid.

EXAMPLE 16

Two grams titanium tetrachloride are dissolved in 50 cc. hexane and 3.5 grams solid magnesium dimethyl are added in a nitrogen atmosphere. The mixture is introduced, under nitrogen, into a small ball mill and vigorously ground for one hour. The ball mill is then emptied into a 200 cc. autoclave and the ball mill itself washed out with an additional 25 cc. of hexane. Ethylene is thereupon added under a pressure of 70 atmospheres and the autoclave is shaken. The autoclave spontaneously heats itself to about 50° C. and the ethylene pressure drops. Ethylene is again added three times under pressure until a total of 30 grams of ethylene have been introduced into the autoclave. Finally, the autoclave is shaken for a few hours until the pressure in it has dropped to a low residual amount. The contents of the autoclave then consists of a solid cake of baked-together polyethylene particles permeated by the solvent. The cake can be very easily removed from the autoclave. It is kneaded with methyl alcohol and thereupon washed with methylalcoholic hydrochloric acid and then again with methyl alcohol, and then dried. There is obtained a white polymer which is insoluble, or at most swells in the customary solvents, and which becomes soft at between 150 and 200° C. It can be readily molded at 170° C. into a clear foil.

In the experiment described here, it is immaterial whether ethylene is used under the indicated pressure or at lower pressures, or even with the passage of ethylene through the catalyst mixture.

EXAMPLE 17

To 24.6 grams zinc diethyl, there are added 6 grams finely pulverized anhydrous zirconium tetrachloride, followed by heating until the particles of zirconium tetrachloride, which at first were still suspended, have completely disappeared. There is thereupon added under nitrogen 200 cc. benzene. The mixture is then poured into a 500 cc. autoclave and treated with ethylene in the manner described in Example 16. The ethylene is rapidly absorbed and a swollen gel-like mass of polyethylene deposits in the autoclave, which mass is first of all thoroughly kneaded with methyl alcohol and thereup freed from the solvents by steam distillation in the presence of ordinary hydrochloric acid. The polyethylene then remains suspended in the aqueous phase in the form of pure white granules. The yield of polyethylene is practically quantitative.

EXAMPLE 18

Into a Grignard solution consisting of 157 grams bromobenzene and 24 grams magnesium in 500 cc. ether, there are added drop by drop, at the boiling point, 42.5 grams of the tetrabutyl ester of orthotitanic acid—Ti(OC$_4$H$_9$)$_4$—followed by heating for a further hour at a gentle boil. Advisedly as much ether as possible is then distilled from a bath heated to 50° C., and the mixture which still remains is introduced into an autoclave of suitable size. Ethylene is introduced under a pressure of about 50 atmospheres, and the autoclave is heated to about 100° C. In this way the ethylene is rapidly polymerized and thereupon further polyethylene can be added under pressure a number of times before the activity of the catalyst is finally weakened, due to its being enveloped by the deposited polymers. The further treatment is effected in a manner similar to that described in the preceding examples. The polyethylene obtained is similar to the products which can also be obtained with titanium tetrachloride and Grignard compound.

EXAMPLE 19

10 cc. of a 6-molar lithium butyl solution in benzene were ground together with 1 gm. of zirconium tetrachloride and 70 cc. of hexane for two hours in an oscillating ball mill with exclusion of air. The blackish-brown suspension produced was introduced in an atmosphere of nitrogen into a 200 cc. autoclave and 40 gm. of ethylene were pumped in. The autoclave was then heated with shaking to 100 to 110° C. and the pressure rose to 80 atmospheres. After four hours the pressure had fallen to 25 atmospheres and after a further 20 hours had fallen to 10 atmospheres. After cooling 3 gm. of ethylene were released. A thick paste of polyethylene in hexane, coloured gray by catalyst residues, remained in the autoclave. For purification purposes the polyethylene was separated by filtration from solvent and boiled with methanolic hydrochloric acid, which dissolved out the catalyst residues contained in the polyethylene. The product was thereafter washed with methanol and acetone to remove adhering hydrochloric acid. In this way 35 gm. of a pure, white product were obtained.

Corresponding quantities of titanium tetrachloride, thorium-IV-acetylacetonate or chromium-III-acetylacetonate can be used in place of zirconium tetrachloride, when the reaction takes place analogously.

EXAMPLE 20

A fine suspension was produced from 12 gm. of sodium aluminum tetramethyl (produced in manner analogous to sodium aluminum tetraethyl, Journal of Organic Chemistry, vol. 5 (1940), page 111) and 80 cc. of hexane by grinding intensively for one hour in an oscillating ball mill with exclusion of air. 4 gm. of titanium tetrachloride dissolved in 20 cc. of hexane were added dropwise to this solution with stirring, whereby the suspension was coloured black and evolution of gas became noticeable. This fine black suspension was then introduced into a 200 cc. autoclave. 40 gm. of ethylene were pumped in and the autoclave was heated with shaking to 100° C. The presure initially rose from 50 to 80 atmospheres and then fell in the course of 20 hours to 25 atmospheres. After cooling, 7 gm. of ethylene were blown off. The autoclave contained 30 gm. of polyethylene finely distributed in hexane and coloured gray-black by the catalyst. For purification purposes the polyethylene was filtered off from the solvent and boiled out with methanolic hydrochloric acid. After washing with methanol and acetone and drying at 80 to 100° C., a pure white finley powdered product remained.

EXAMPLE 21

100 gm. of a mixture of aluminum trialkyls, of the mean composition of aluminum tridodecyl produced as described in Example 5 of copending application No. 524,797, from cracking olefines, were dissolved in 200 cc. of hydrogenated Fischer-Tropsch diesel oil of boiling point 200 to 250° C. and heated with intensive stirring with 10 gm. of sodium to 130 to 150° C. The solution was darkened in colour by precipitated aluminum and a part of the sodium went into solution. The aluminum balled together with the excess sodium on slowly cooling the mixture to approximately 90° C.; the solution clarified and could be decanted from the deposited solid matter. Unlike the sodium aluminum tetramethyl of Example 20, the complex compound of the mean composition $Na(C_{12}H_{25})_4Al$ remains in solution in the diesel oil.

50 cc. portions of the solution were then employed for the following experiments:

(a) 50 cc. of the solution produced as described above were mixed with 600 cc. of Fischer-Tropsch diesel oil, the resultant solution was introduced into a 1-litre glass vessel and 1 gm. of titanium tetrachloride dissolved in 500 cc. of diesel oil was added dropwise with stirring and exclusion of air, whereupon the solution blackened with separation of a finely divided precipitate. Ethylene was then passed in with vigorous stirring at 70 to 90° C. and polymerized in the reaction vessel to form polyethylene threads and agglomerates which slowly precipitate from the solvent. The addition of ethylene was regulated so that the unpolymerized ethylene flowing from the outlet tube into a bubble counter bubbled only gently. The experiment was concluded after 5 minutes and the polyethylene produced was worked up as described in Example 20. In this way 75 gm. of a very pure white very finely powdered polyethylene were obtained.

(b) 3 gm. of thorium-IV-acetylacetonate were added to 50 cc. of the above described solution and the resultant yellow coloured solution was diluted with 30 cc. of hydrogenated Fischer-Tropsch diesel oil. The total solution was then introduced in an atmosphere of nitrogen into a 200 cc. autoclave and 33 gm. of ethylene were pumped in. The autoclave was heated with shaking to 90° C. whereupon the pressure rose to 50 atmospheres. After 15 hours the pressure had fallen to 15 atmospheres. After cooling and blowing off the unpolymerized ethylene (8 gm. in all) there remained in the autoclave 22 gm. of powdery polyethylene suspended in hexane, which was worked up in the usual way as described in Example 20.

(c) 50 cc. of the above-described solution were diluted with 350 cc. of hydrogenated Fischer-Tropsch diesel oil and intensively ground in an oscillating ball mill. The dark brown suspension was introduced in an atmosphere of nitrogen into a 1-litre stirring autoclave and heated to 90° C. under a constant ethylene pressure of 10 atmospheres. After 10 hours the experiment was interrupted. After blowing off the excess ethylene, the polyethylene in the autoclave was worked up in the usual way after separation from the diesel oil. In this way 85 gm. of pure white finely powdered polyethylene were obtained.

(d) 50 cc. of the complex salt solution were mixed with 150 cc. of hydrogenated Fischer-Tropsch diesel oil and 1.5 gm. of chromium-III-bromide and were intensively ground for two hours in an oscillating ball mill. The black suspension produced was then treated in an atmosphere of nitrogen in a 500 cc. autoclave with 65 gm. of ethylene, the initial pressure of 45 atmospheres increased on heating to 100° C. with shaking to 100 atmospheres and then decreased in the course of 40 hours to 25 atmospheres. After cooling 11 gm. of ethylene were released. There remained in the autoclave a paste of ethylene polymers finely suspended in the diesel oil, which were worked up in the usual way to give 50 gm. of a fine white polyethylene powder.

EXAMPLE 22

About 4.75 gms. of titanium tetrachloride are introduced into a solution of 5.7 gms. triethyl aluminum in 250 ml. of a Fischer-Tropsch diesel oil (suitably freed, by hydrogenation, of unsaturated constituents and successively distilled over sodium) with stirring and under a nitrogen atmosphere. Agitation is continued for one hour at room temperature. A suspension of a brown-black substance in the diesel oil is formed. The suspension of the catalyst thus obtained is introduced, with stirring into a 5 liter autoclave filled with nitrogen and containing 1.0 liter of the diesel oil, and 600 gms. of dried, air-free propylene are pumped in. The temperature is raised to 70° C., stirring being continued, whereupon the pressure increases to a maximum of 21 atm. Within 72 hours, the pressure decreases to 11.0 atm. The unreacted propylene is then released from the warm autoclave and 225 gms. propylene are recovered. The solid polypropylene occurs in a paste-like suspension in the diesel oil. The suspension is somewhat dark in color due to the presence of portions of the catalyst therein. The solvent is removed from the polypropylene by suction, and the polymer is then freed of diesel oil by washing with acetone. The polymer is then decolorized by heating it under stirring, with methanolic hydrochloric acid. The colorless polypropylene is washed under suction with water to remove the hydrochloric acid, then with acetone to remove the bulk of the moisture, and finally dried.

An additional quantity of the polypropylene is recovered from the diesel oil mother liquor by precipitation with acetone, and may be processed as described. A total yield of 338 gms. of granular polypropylene is obtained.

EXAMPLE 23

Example 22 is repeated, except that the propylene is replaced by an equivalent amount of alpha-butylene or of a $C_4$-hydrocarbon rich in alpha-butylene. The poly-n-butylene obtained resembles the polypropylene of Example 22 in appearance but is somewhat softer.

EXAMPLE 24

About 30 ml. of air-free Fischer-Tropsch diesel oil distilled over sodium and completely saturated by hydrogenation are introduced into a small (150 ml.) ball mill arranged for working under nitrogen, together with 17.1 gm. triethyl aluminum and 11.7 g. zirconium tetrachloride, and the whole is ground for 24 hours to obtain an intimate mixture. A thick black suspension is obtained. It is mixed with 1.0 liter of the same diesel oil and introduced under nitrogen into a 5 liter autoclave equipped with a stirrer. 590 g. of propylene are then pumped in at room temperature, stirring is commenced, and the autoclave is heated to 80° C. Within 50 hours the pressure falls from the initial 23 atm. down to 14.2 atm. The reaction is interrupted, the autoclave is allowed to cool, and the excess propylene is vented. 190 g. of propylene are recovered. The mass contained in the autoclave is a thick black slurry which, after the addition of acetone and filtration under suction, becomes colorless. The residual catalyst is extracted by heating with alcoholic hydrogen chloride. After repeated washing with acetone and drying, 400 g. of a white, flocculent polypropylene are obtained. The polymer can be easily pressed into foils and rolled into a sheet.

As may be seen from the above examples, the normally solid hydrocarbon polymer such as polyethylene prepared by the catalytic polymerization of ethylene or a polymer prepared from another olefinic compound having a terminal methylene group such a propylene is freed from the catalyst impurities by reaction with a lower alkanol.

In place of the methanol used in the examples, ethanol, propanol, and butanol may be used. The alkanol may thus have from 1–4 carbon atoms per molecule and may be characterized by the formula $C_nH_{2n+1}OH$ wherein $n$ is a number from 1 to 4 inclusive.

The hydrocarbon polymer such as the polyethylene purified in accordance with the invention may be formed by the polymerization using any of the catalyst systems and under any of the conditions as described in the above-mentioned co-pending applications.

Thus, the catalyst system used for the polymerization may consist of a catalyst formed by mixing an organo-metal compound with a compound of a heavy metal selected from the group consisting of metals of Groups IVb, Vb, VIb of the Periodic System, including thorium and uranium.

As the organo-metal compounds, there may be used aluminum trialkyls; compounds of the formula $R_2AlX$ in which R is hydrogen, a alkyl radical or aryl radical and X is hydrogen, an alkyl radical, aryl radical, halogen atom, alkoxy radical, aroxy radical, or the like; magnesium and zinc dialkyls, aryls, and halogenated aryls and alkyls; alkali metal alkyls, alkaline earth metal alkyls, hydrides, complex compounds and the like.

The heavy metal compounds which may be used in combination with the organo-metal compounds include: compounds of titanium, zirconium, cadmium, thorium, uranium, vanadium, niobium, tantalum, chromium molybdenum, and tungsten as for example halogenides, such as chlorides or bromides, oxyhalogenides, as for example oxychlorides, complex haogenides, as for exampe complex fluorides, freshly precipitated oxides or hydroxides, or organic compounds as alcoholates, acetates, benzoates, or acetylacetonates.

The catalyst systems for preparing the polymers to be purified in accordance with the invention thus include initiators which are the product obtained by admixing a component containing a member of the class consisting of titanium, and zirconium, attached to a group of the class consisting of oxyhydrocarbon, and halide with a second component having a hydrocarbon attached directly to the metal, said metal being of a class consisting of alkali metals, alkaline earth metals, and aluminum.

The presure at which the polymerization is effected is not critical and pressures ranging from below atmosphere to the highest practical pressures may be used though pressures below about 100 and preferably below about 10 atmospheres are preferred.

The temperature of the contacting is also not critical and the contacting may, for example, be effected from normal temperature to temperatures about as high as 250° C. The polymerization may thus take place for example at temperatures between about 20–150° C.

The polymerization of the olefine such as the ethylene is preferably effected in a inert hydrocarbon liquid medium as for example hexane, and the catalyst may be formed by admixing the organo-metal compound with the heavy metal compound in a inert liquid hydrocarbon media. Thus, the initiator may for example be the product obtained by admixing titanium tetrachloride with a metal hydrocarbon compound in an inert liquid hydrocarbon medium.

As may be seen from the above examples, the reaction of the polymer such as the polyethylene with the alkanol may take place at a temperature below the polymerization temperature and may take place, for example, at a normal temperature, which is a temperature within the range of 15–50° C.

The alkanol may also be added to the polymer while the same is in the form of a slurry containing the inert liquid hydrocarbon medium as may be noted from the above examples.

The purification may be visually noted by a change in appearance of the polymer with the same substantially lightening and often becoming pure white. The amount of alcohol used need only be sufficient to cause this change and generally at least a molar equivalent based on the group to be removed may be required.

The contamination of the polymer formed during the polymerization is apparently caused by the incorporation of a portion of the catalyst in the polymer molecule. In accordance with one theory advanced, the heavy metal atoms attach directly to the polymer. Thus, in accordance with this theory, if titanium or zirconium compounds are used in the catalyst system, the titanium or zirconium will attach directly to the polymer and the washing with the alcohol will cause a reaction which will remove such groups from the polymer molecule.

If this theory is correct, then, in accordance with the above examples, the polymer formed would have titanium or zirconium attached directly thereto and the alcohol washing would remove these groups from the polymer molecule by reaction with the alkanol.

Water or molecular oxygen may be used for the purification in place of the alkanol.

We claim:

1. In a process for preparing normally solid hydrocarbon polymers by polymerization in the presence of a catalyst comprising the product obtained by admixing a component containing a heavy metal compound selected from the group consisting of salts, freshly precipitated oxides and hydroxides of metals of Groups IV–B, V–B and VI–B of the Periodic System, including thorium and uranium, with a second component having a hydrocarbon attached directly to a metal of the class consisting of alkali metals, alkaline earth metals, and aluminum, the improvement for purifying the hydrocarbon polymer obtained which comprises contacting the same with methanol.

2. Improvement according to claim 1 in which said catalyst is a catalyst formed by mixing a titanium chloride with an organo metal compound in an inert liquid hydrocarbon medium.

3. Improvement according to claim 2 in which said organo metal compound is an aluminum alkyl.

4. Improvement according to claim 1 in which said polymer is in the form of a slurry when contacted with said methanol.

5. Improvement according to claim 1 in which said catalyst is a product formed by admixing a component containing a member of the class consisting of titanium and zirconium attached to a group consisting of oxyhydrocarbon and halide with said second component.

6. Improvement according to claim 1 in which the hydrocarbon polymer is polyethylene and in which said catalyst is a catalyst formed by admixing a titanium chloride with an aluminum alkyl.

References Cited

UNITED STATES PATENTS 3,012,023  12/1961  Anderson et al. ____ 260—94.9

JOSEPH L. SCHOFER, Primary Examiner.

M. B. KURTZMAN, Assistant Examiner.